(12) United States Patent
Gifford

(10) Patent No.: US 10,703,296 B2
(45) Date of Patent: Jul. 7, 2020

(54) CLAY LAUNCHER MOUNT

(71) Applicant: Scott A. Gifford, Valley Head, AL (US)

(72) Inventor: Scott A. Gifford, Valley Head, AL (US)

( * ) Notice: Subject to any disclaimer, the term of this patent is extended or adjusted under 35 U.S.C. 154(b) by 0 days.

(21) Appl. No.: 15/943,114

(22) Filed: Apr. 2, 2018

(65) Prior Publication Data

US 2019/0299873 A1 Oct. 3, 2019

Related U.S. Application Data

(60) Provisional application No. 62/480,609, filed on Apr. 3, 2017.

(51) Int. Cl.
| | | |
|---|---|---|
| *B60R 9/08* | (2006.01) | |
| *B60R 9/06* | (2006.01) | |
| *F41J 9/20* | (2006.01) | |

(52) U.S. Cl.
CPC .................. *B60R 9/08* (2013.01); *B60R 9/06* (2013.01); *F41J 9/20* (2013.01)

(58) Field of Classification Search
CPC ............... B60R 2011/008; B60R 9/10; Y10S 2249/924; B60D 1/167; B60D 1/1675; B60D 1/52
See application file for complete search history.

(56) References Cited

U.S. PATENT DOCUMENTS

| | | | | |
|---|---|---|---|---|
| 3,627,352 A | * | 12/1971 | Canole ................... | B60D 1/167 280/475 |
| 3,897,085 A | * | 7/1975 | Hawkins ................ | B60D 1/143 280/402 |
| 3,976,213 A | * | 8/1976 | Ball ....................... | B60P 3/1025 414/462 |
| 4,397,475 A | * | 8/1983 | Dietrich, Sr. ............ | B60D 1/52 280/495 |
| 4,614,354 A | * | 9/1986 | Stagner .................. | B60D 1/143 280/415.1 |
| 4,856,686 A | * | 8/1989 | Workentine .............. | B60R 9/06 224/497 |
| 4,867,356 A | | 9/1989 | Melby | |
| 5,096,102 A | * | 3/1992 | Tolson ..................... | B60R 9/06 224/501 |
| 5,190,195 A | * | 3/1993 | Fullhart ..................... | B60R 9/10 224/497 |
| 5,228,607 A | * | 7/1993 | Tolsdorf ..................... | B60R 9/06 224/520 |
| 5,388,736 A | * | 2/1995 | Schmidt .................... | B60R 9/06 224/520 |
| 5,465,993 A | * | 11/1995 | Gee .......................... | B60D 1/143 280/475 |
| 5,615,813 A | * | 4/1997 | Ouellette ................... | B60P 3/40 224/405 |
| 5,630,606 A | * | 5/1997 | Ryan ......................... | B60D 1/40 280/479.3 |
| 5,678,743 A | * | 10/1997 | Johnson .................... | B60P 3/40 224/405 |

(Continued)

*Primary Examiner* — Brian D Nash
(74) *Attorney, Agent, or Firm* — Lanier Ford Shaver & Payne, PC; Jeremy A. Smith

(57) ABSTRACT

The present disclosure provides an adjustable mounting system comprising a vehicle attachment section, an extender and a launcher platform.

8 Claims, 9 Drawing Sheets

(56) References Cited

U.S. PATENT DOCUMENTS

| | | | | |
|---|---|---|---|---|
| 5,685,686 A * | 11/1997 | Burns | | B60R 9/06 224/282 |
| 5,690,260 A * | 11/1997 | Aikins | | B60R 9/06 224/504 |
| 5,752,639 A * | 5/1998 | Rice | | B60R 9/06 224/510 |
| 5,775,560 A * | 7/1998 | Zahn | | B60R 9/06 224/485 |
| 6,070,926 A * | 6/2000 | Hardin | | B60P 3/40 224/518 |
| 6,173,984 B1 * | 1/2001 | Kay | | B60D 1/145 280/491.5 |
| 6,314,891 B1 * | 11/2001 | Larson | | A47B 3/14 108/44 |
| 6,644,525 B1 * | 11/2003 | Allen | | B60R 9/06 224/282 |
| 6,685,212 B1 * | 2/2004 | Penlerick | | B60D 1/143 280/477 |
| 8,419,039 B1 * | 4/2013 | Magalhaes | | B60D 1/46 280/478.1 |
| 8,439,388 B1 * | 5/2013 | Westervelt | | B60D 1/1675 280/492 |
| 2005/0082329 A1 * | 4/2005 | Cohen | | B60R 9/06 224/519 |
| 2008/0099522 A1 * | 5/2008 | Clausen | | B60R 9/06 224/519 |
| 2009/0261136 A1 * | 10/2009 | Skoff | | B60R 9/06 224/519 |
| 2011/0240700 A1 * | 10/2011 | Williams | | B60R 9/10 224/518 |
| 2015/0083769 A1 * | 3/2015 | Williams | | B60R 9/10 224/488 |
| 2017/0181366 A1 * | 6/2017 | Fay, II | | A01B 73/005 |
| 2017/0203699 A1 * | 7/2017 | Williams | | B60R 9/10 |
| 2018/0354427 A1 * | 12/2018 | Yazdian | | B60R 9/10 |

* cited by examiner

CLAY LAUNCHER MOUNT

CROSS REFERENCE TO RELATED APPLICATIONS

This application claims priority to, and the benefit of, U.S. Provisional Patent Application No. 62/480,609 filed Apr. 3, 2017.

FIELD OF THE DISCLOSURE

The present disclosure pertains to an adjustable mounting system for a clay launcher. More specifically the present disclosure pertains to an adjustable mounting system for a clay launcher that is mounted to the hitch of a vehicle.

BACKGROUND

Clay shooting (or skeet shooting) is a very popular sporting past time with approximately 10-15 million people in the US in 2009. Most clay launchers are positioned on the ground or hand held. The ground mounted clay launchers typically rely upon some sort of push button or pull-string activated activation mechanism to release (or throw) the clay which often requires the operator to crouch down to launch a clay or reload the launcher. Often times the operator is stuck in the crouching position for an extended period of time which can pose a problem for those with back pain or back issues as the crouching position is very uncomfortable or even impossible to maintain. Accordingly, there exists a need for a clay launcher mount that will allow one to operate a clay launcher in a more natural and comfortable position. Such a mount is provided in this disclosure.

BRIEF DESCRIPTION OF THE DRAWINGS

To further illustrate the advantages and features of the present disclosure, a more particular description of the invention will be rendered by reference to specific embodiments thereof which are illustrated in the appended drawings. It is appreciated that these drawings are not to be considered limiting in scope. The invention will be described and explained with additional specificity and detail through the use of the accompanying drawings in which.

DETAILED DESCRIPTION

Figure 1:
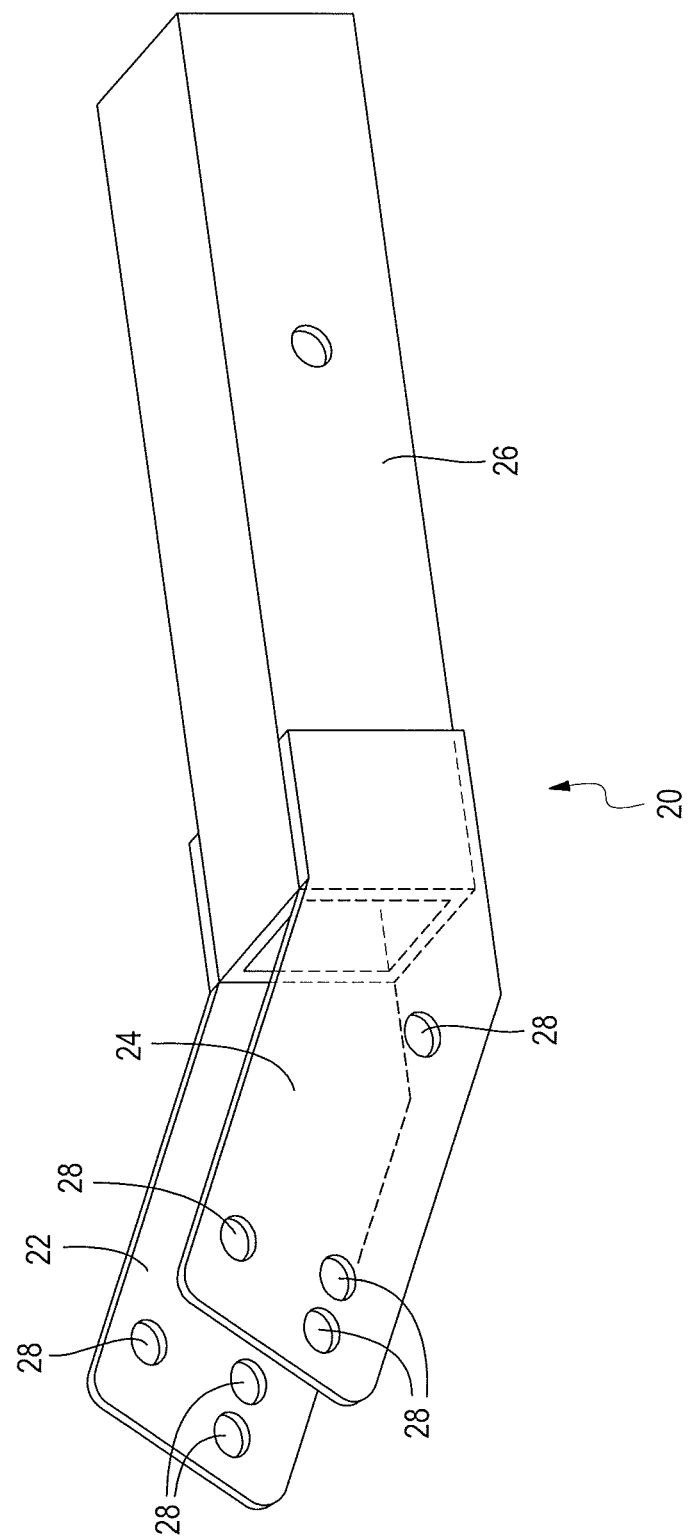
FIG. 1 shows a side view of one embodiment of the vehicle attachment section of the adjustable mounting system.
Figure 2:
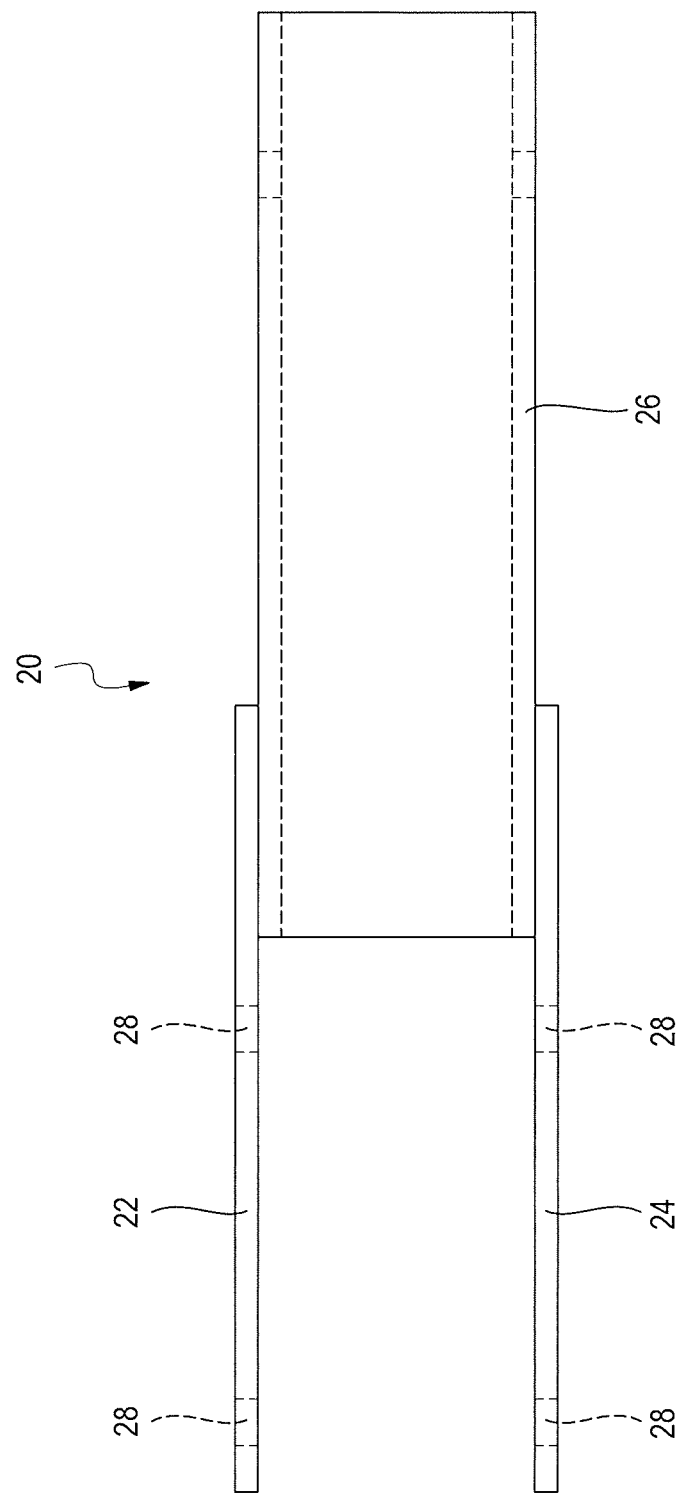
FIG. 2 shows a top view of one embodiment of the vehicle attachment section of the adjustable mounting system.
Figure 3:
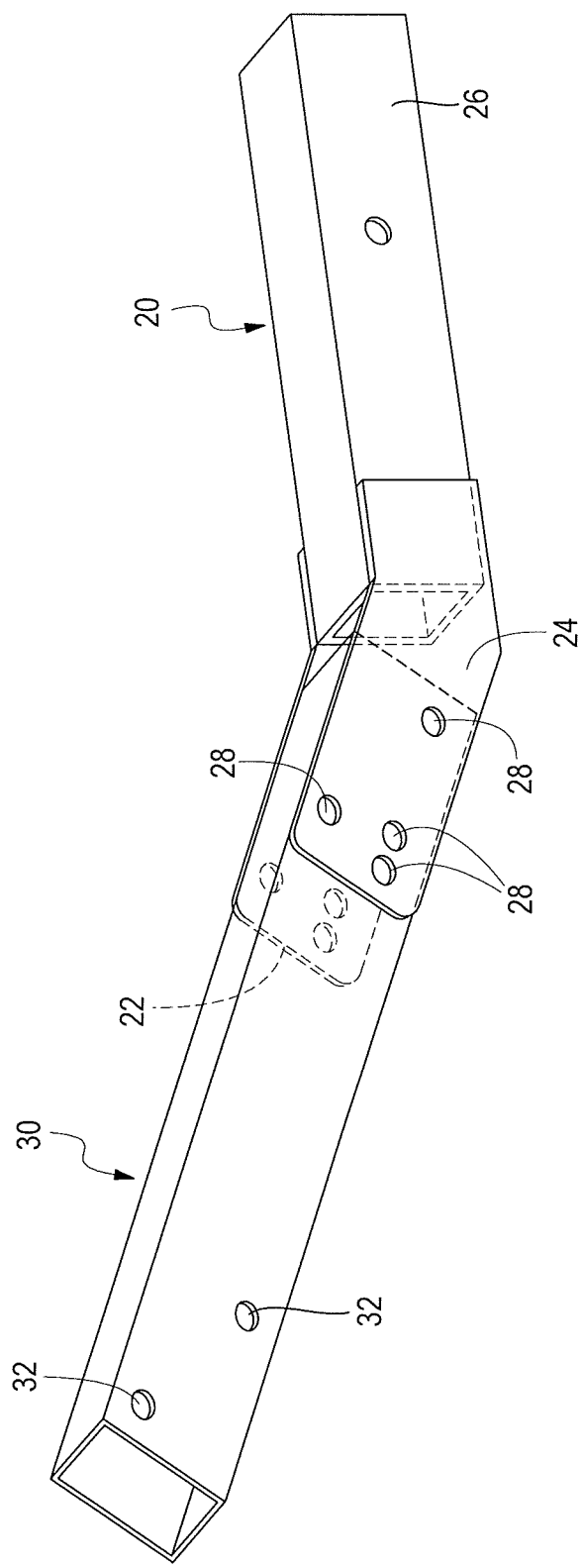
FIG. 3 shows a side view of one embodiment of the extender attached to the vehicle attachment section.
Figure 4:
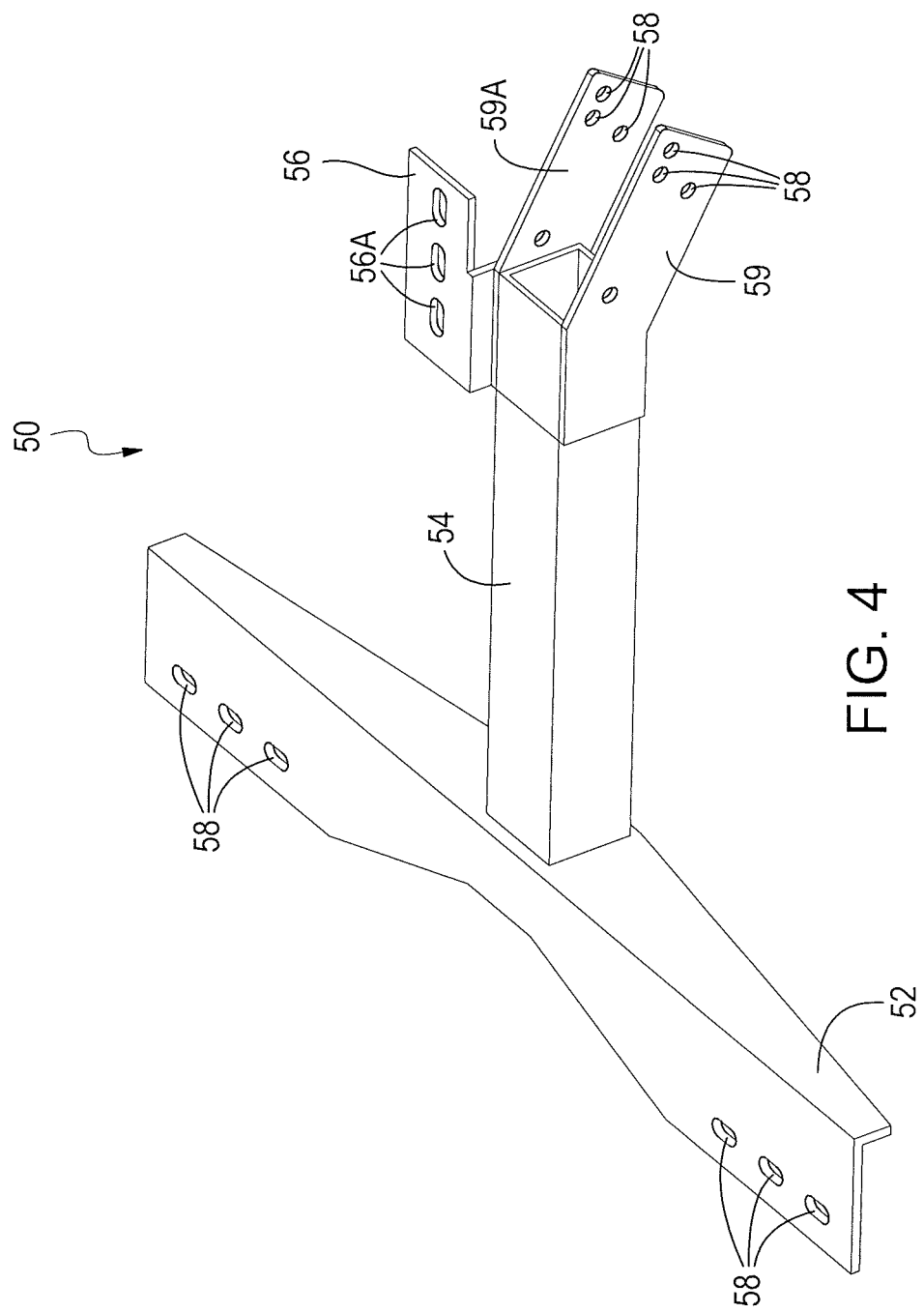
FIG. 4 shows a top view of one embodiment of the adjustable mounting system.
Figure 5:
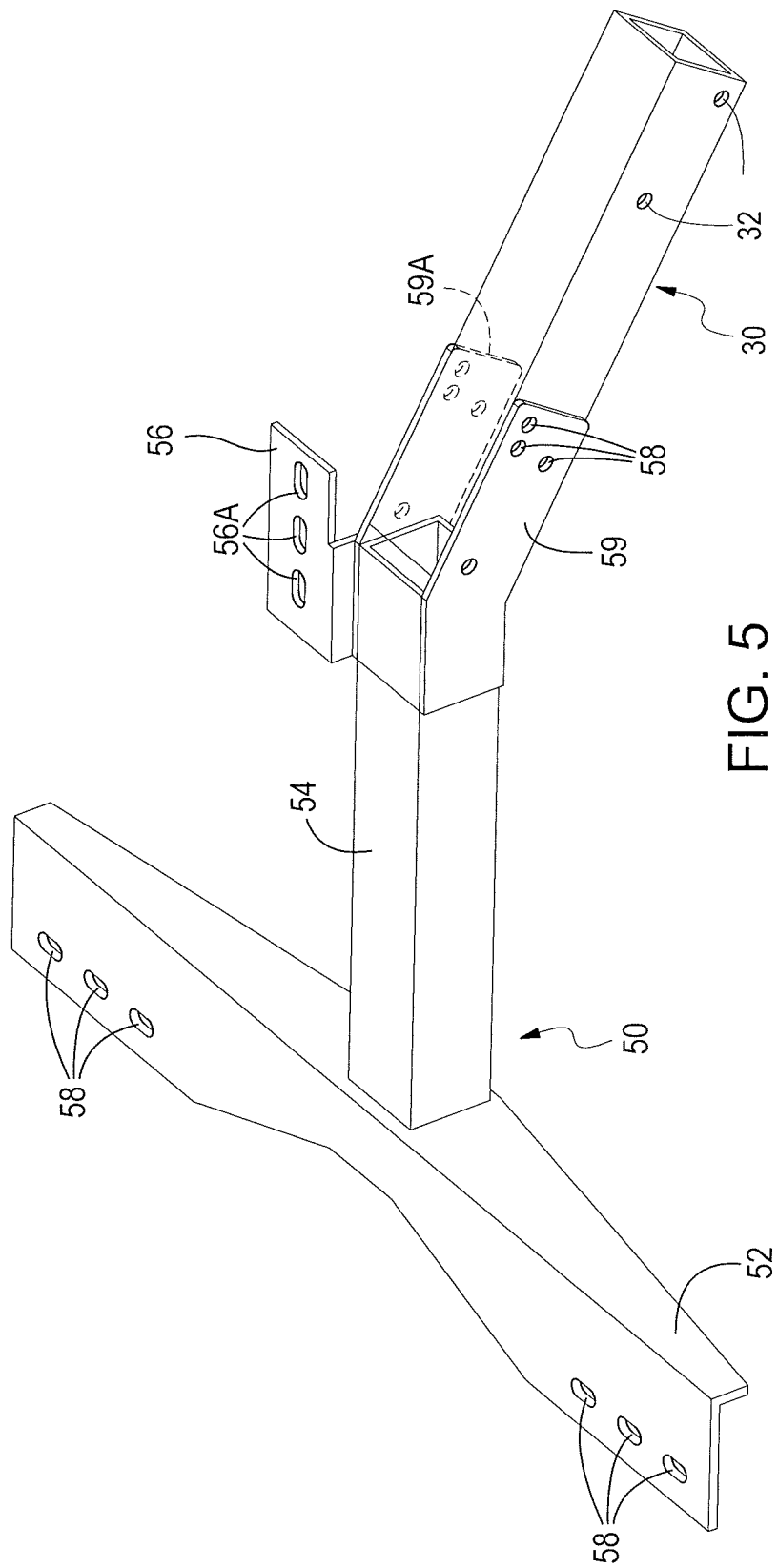
FIG. 5 shows a side view of one embodiment of the launcher platform attached to the extender.
Figure 6:
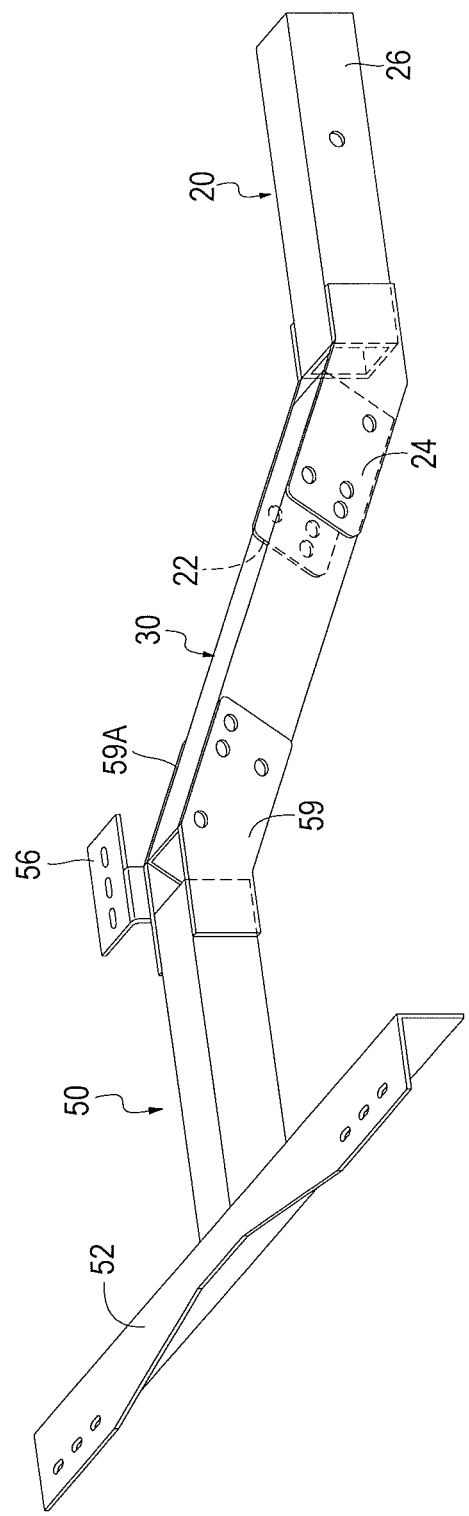
FIG. 6 shows an alternate view of the launcher platform attached to the extender and the extender attached to the vehicle attachment section.
Figure 7:
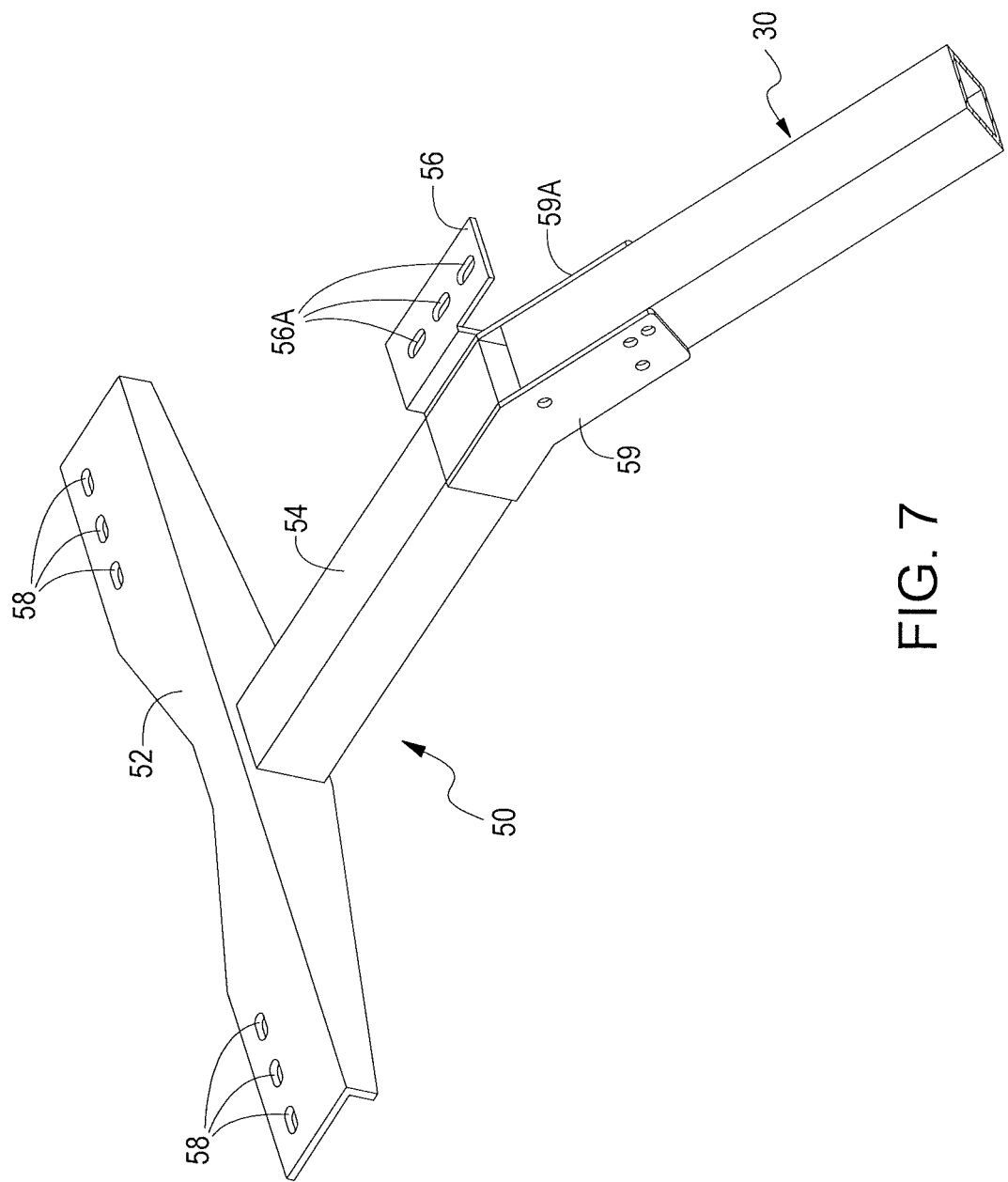
FIG. 7 shows a top view of one embodiment of the launcher platform.
Figure 8:
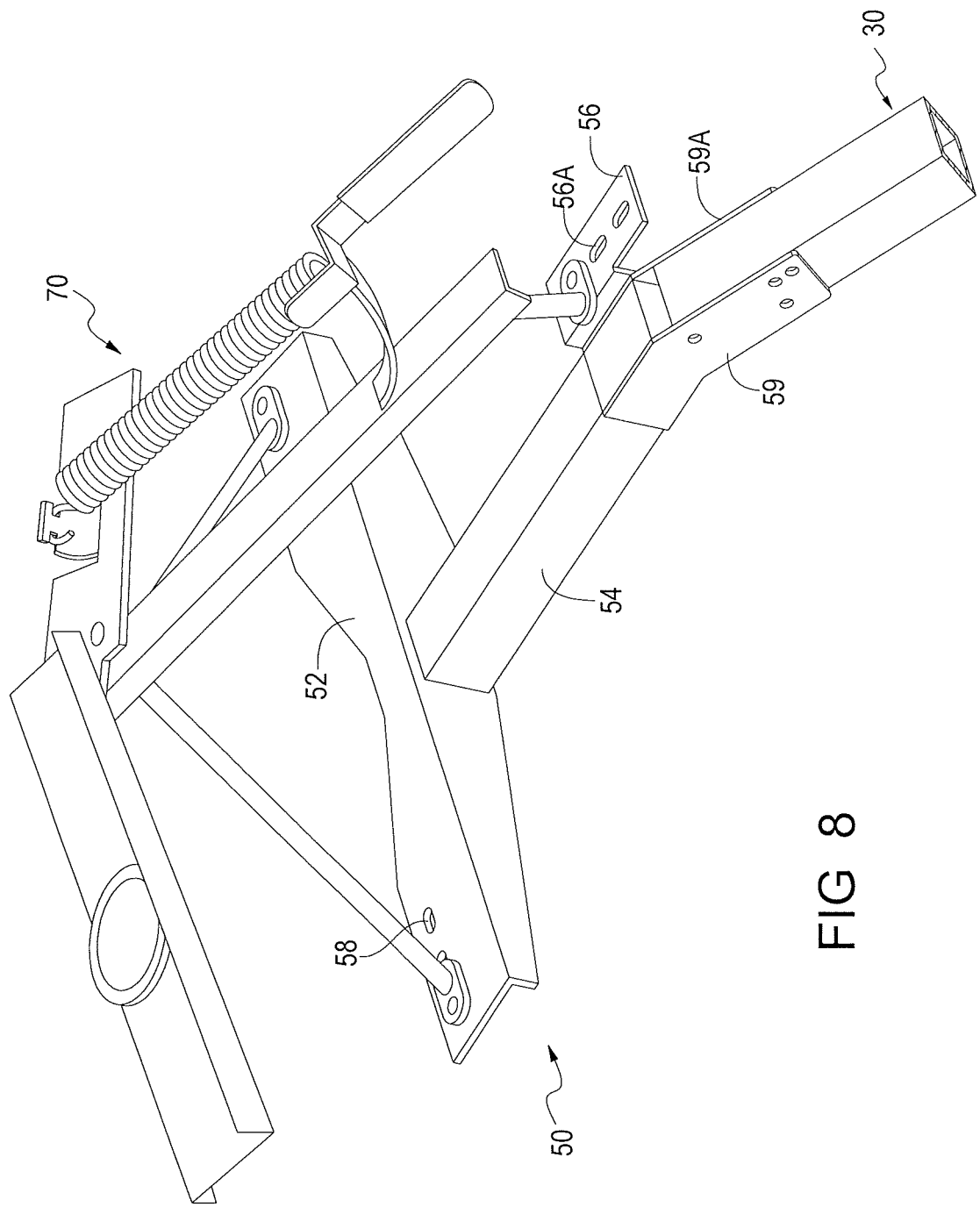
FIG. 8 shows one embodiment of the adjustable mounting system with a clay launcher mounted thereon.

Now referring to FIGS. 1-10, the adjustable mounting system 10 of the present disclosure is comprised of a vehicle attachment section 20, an extender 30 and a launcher platform 50 that each serve a different purpose. The vehicle attachment section 20, an extender 30 and a launcher platform 50 are adjustable relative to one another, as discussed herein, to allow the adjustable mounting system 10 to be adjusted for different uses with various vehicles, clay launchers 70 and operators of different build.

The vehicle attachment section 20 comprises a male member 26 and two (2) arms 22, 24 affixed thereto. The arms 22, 24 may be welded or affixed to the male member 26 in any manner known to those of ordinary skill in the art. The male member 26 is configured to be received by a standard receiver hitch mounted to a vehicle. For example, the male member 26 may be a square hollow tube approximately 2 inches×2 inches large. Alternatively, it could be manufactured from other suitable materials such as a u-shaped metal piece. On one end, the male member 26 comprises an opening that receives a locking pin that passes through the receiver hitch and the male member 26 to secure the male member to the receiver hitch. Alternatively (not shown) the vehicle attachment section 20 could comprise a trailer tongue configured to receive a ball which is attached to the vehicle.

On its opposite end, the male member 26 comprises arms 22, 24 that angle diagonally upwardly therefrom. The arms 22, 24 are spaced apart and configured to receive the extender 30 (as discussed below). The arms 22, 24 have a plurality of openings 28 that provide various attachment points for the extender 30 which has a plurality of openings 32 complementary to the openings 28 through which a bolt or pin (or other securing means known to those of ordinary skill in the art) can be passed. The openings 28 on the opposing arms 22,24 are identical to one another in a preferred embodiment. In this preferred embodiment, each opposing arm 22,24 has three (3) openings.

The numerous openings 28 on the vehicle adjustment section 20 and the numerous openings 32 on the extender 30 provide a measure of adjustability in that depending on which openings 28 and complementary openings 32 are used, the height and angle of the extender 30 can be adjusted to compensate for being used with various vehicles, clay launchers 70 and operators of different build. For example, attaching the extender 30 to the vehicle attachment section 20 in a first series of openings may increase the height of the distal end of the extender 30 while bringing it closer to the vehicle and attaching the extender 30 to the vehicle attachment section 20 in a second series of openings may lower the height of the distal end of the extender 30 while moving it further away from the vehicle. The desirable position of the distal end of the extender 30 can vary depending upon the vehicle, clay launcher and build of the operator.

The extender 30 comprises a long tube of complementary size to be received by the space created between the arms 22, 24. In one embodiment the size of the extender 30 is identical (or nearly identical) to that of the vehicle attachment section 20 male member 26. The extender 30 comprises a plurality of openings 32 on both ends that are complementary on one end to the openings 28 on arms 22, 24 and on the other end complementary to openings 58 on arms 59, 59A of the launcher platform 50. As discussed above, the openings 32 complementary to the openings 28 on arms 22, 24 provide adjustability of the angle of the extender 30 relative to the vehicle attachment section 20. The openings 32 complementary to openings 58 on arms 59, 59A likewise provide adjustability of the launcher platform 50 relative to the extender 30. In one preferred embodiment, the openings 32 on one end of the extender are mirror images of those on the opposite end of the extender 30.

The launcher platform 50 provides a stable base upon which the clay launcher 70 can be placed. In one embodiment, the launcher platform 50 comprises on one end arms 59, 59A opposite one another and a second launcher attachment point 56. Similarly to the arms 22, 24 of the vehicle attachment section 20, the space created between arms 59, 59A receives the extender 30. Arms 59, 59A comprises a plurality of openings 58 which complement the openings 32 on the extender 30 through which a bolt or pin (or other securing means known to those of ordinary skill in the art) can be passed to affix the launcher platform 50 to the extender 30.

The second launcher attachment point 56 (or 66) provides a stable and, in one preferred embodiment, flat surface upon which a leg of a clay launcher 70 can be placed. The second launcher attachment point 56 also provides a plurality of openings 56A that allow the leg of the clay launcher 70 to be secured to the launcher platform 50 via a bolt or pin (or other securing means known to those of ordinary skill in the art). The second launcher attachment point 56 may be attached either to one of the arms 59, 59A or to tube 54. In an alternate embodiment two second launcher attachment points 56 may be provided on either side of tube 54.

Tube 54 extends away from the second launcher attachment point 56 to the first launcher attachment point 52. The tube 54 may be sized to be identical (or nearly identical) to the size of the extender 30 and male member 26.

The first launcher attachment point 52, in one embodiment, is a long rectangular member with opposing openings 52A and 52B on opposite ends. The opposing openings 52A, 52B allow the leg of the clay launcher 70 to be secured to the launcher platform 50 via a bolt or pin (or other securing means known to those of ordinary skill in the art).

In an alternate embodiment (not shown) the launcher platform 50 may be a flat surface upon which the clay launcher 70 can be placed and secured.

Figure 9:
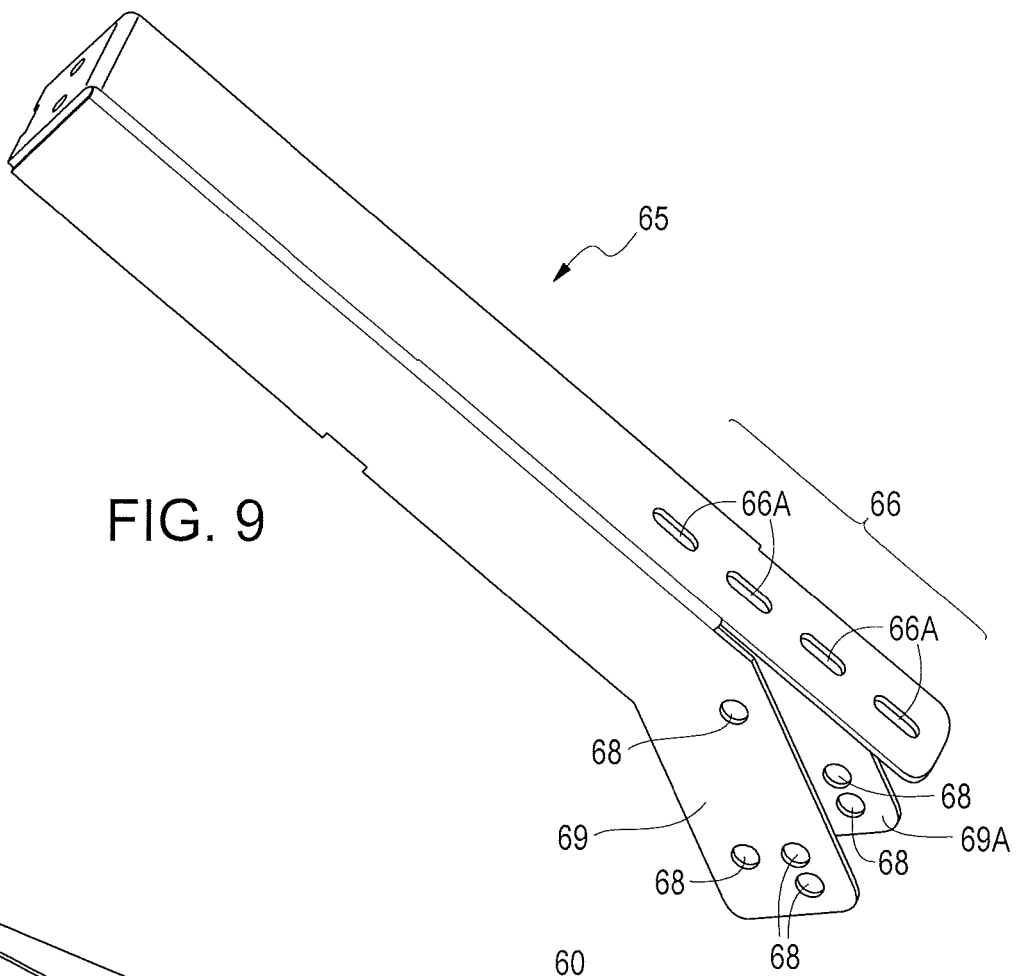
FIG. 9 shows one embodiment of the horizontal platform.
Figure 10:
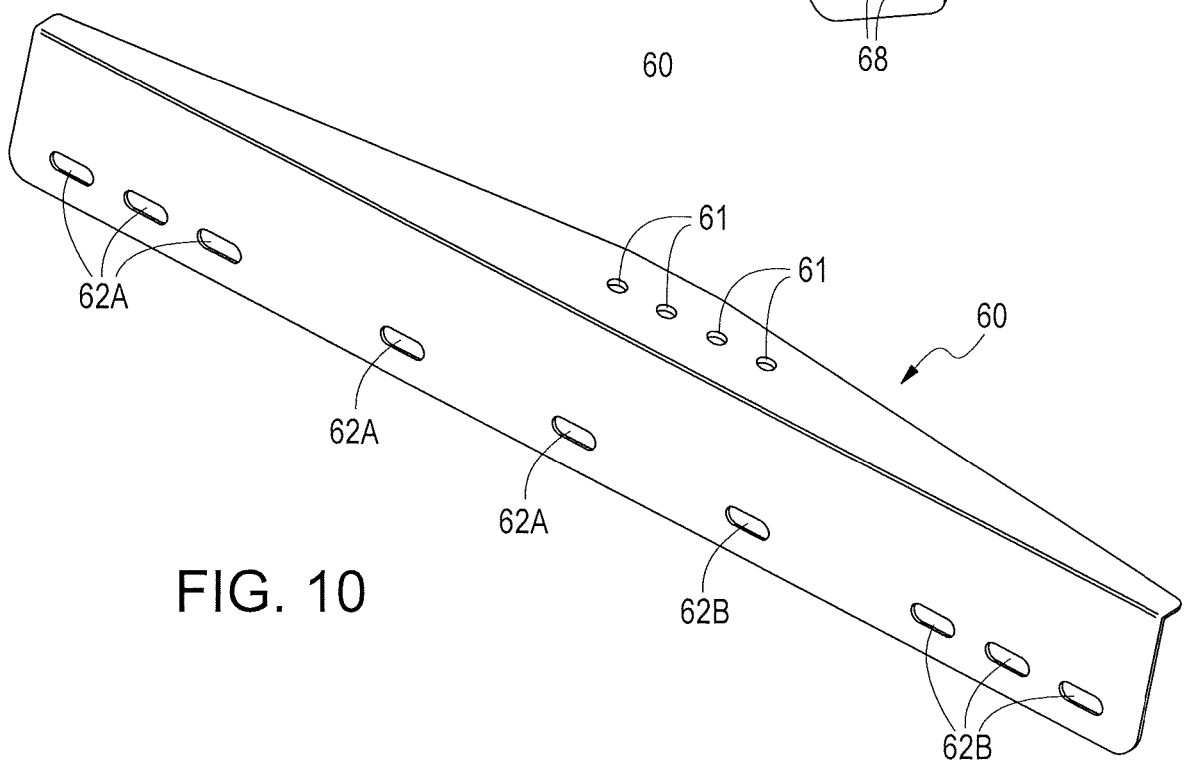
FIG. 10 shows one embodiment of the bridge.

In one embodiment as shown in FIGS. 9 and 10, the launcher platform 50 may be comprised of two (2) pieces, a horizontal platform 60 and a bridge 65. In this embodiment, the bridge 65 comprises on one end arms 69, 69A opposite one another (which comprise a plurality of openings 68) and a second launcher attachment point 66. The bridge 65 may be connected to the horizontal platform 60 through one or more bolts. The use and function of the launcher platform 50 is similar to what is described above.

Once the clay launcher 70 is secured to the launcher platform 50, the clay launcher 70 has been elevated off of the ground and at a height where it can be operated more comfortably. For example, if the adjustable mounting system 10 is attached to a truck, an operator may be able to lower the tailgate of the truck and sit on the tailgate while operating the clay launcher 70.

The adjustable mounting system 10 may be manufactured from any suitable material and in preferred embodiments is manufactured from metallic materials.

Although particular embodiments of the present disclosure have been described, it is not intended that such references be construed as limitations upon the scope of this disclosure except as set forth in the claims.

I claim:

1. A hitch mounted clay launcher device comprising:
   a. a vehicle attachment section,
   b. an extender, wherein the extender is connected to the vehicle attachment section and is independently adjustable therefrom, and
   c. a launcher platform comprising a bridge intersecting a horizontal platform at a perpendicular angle and wherein the horizontal platform comprises first and second flat clay launcher attachment points on opposite ends thereof and wherein the bridge comprises a third flat clay launcher attachment point where the third attachment point is in the same horizontal plane as the first and second attachment points and wherein the third attachment point is offset from a long axis of the bridge, wherein the adjustment of the extender relative to the vehicle attachment section causes the launcher platform to move vertically relative to the vehicle attachment section.

2. The device of claim 1 wherein the vehicle attachment section comprises two (2) opposing arms that further comprise a plurality of identical openings on each arm.

3. The device of claim 2 where the extender is configured to fit between the opposing arms.

4. The device of claim 3 wherein the extender further comprises a plurality of openings on each end.

5. The device of claim 4 where the openings on each end are mirror images of one another.

6. The device of claim 5 where the openings are configured to compliment the openings on the opposing arms of the vehicle attachment section.

7. The device of claim 1 wherein the vehicle attachment section, the extender and the launcher platform are reversibly connected to one another using bolts.

8. The device of claim 6 wherein the vehicle attachment section, the extender and the launcher platform are reversibly connected to one another using bolts.

* * * * *